United States Patent

[11] 3,561,790

[72] Inventor   Herman E. Jurgens
                421 Banning Ave., Compton, Calif. 90222
[21] Appl. No.  766,800
[22] Filed      Oct. 11, 1968
[45] Patented   Feb. 9, 1971

[54] SELF-STEERING AND BACKABLE TRAILER
     7 Claims, 5 Drawing Figs.
[52] U.S. Cl. .................................................. 280/423,
                                                              280/81
[51] Int. Cl. ..................................................... B62d 53/06
[50] Field of Search .......................................... 280/423,
                                          423(A), 81, 81(.1), 415(.3)

[56]              References Cited
              UNITED STATES PATENTS
2,126,819   8/1938   Schawlem ..................... 280/423
2,333,853  11/1943   Fellabaum ..................... 280/423
2,433,268  12/1947   Fellabaum ..................... 280/104.5
2,662,781  12/1953   Hopson ......................... 280/423
3,044,795   7/1962   Standing et al. ............... 280/423X
3,112,935  12/1963   Gregg et al. ................... 280/423X(A)

Primary Examiner—Leo Friaglia
Attorney—Howard L. Johnson

ABSTRACT: A self steering and backable highway trailer consisting of two components: (1) a cargo frame with vertically hinged drawbar at one end and nonswiveling wheels at the other end, and (2) a swivel-mounted front undercarriage or dolly coupled to the frame by a pair of dependent pivot pins spaced apart along the longitudinal axis of the frame and extending through a channeled pressure disc of the dolly. The pins form alternate swivel points for the dolly, on opposite sides of the transverse axle and in each case the functioning pivot point being in the direction of travel taken by the trailer, with the other pivot pin being swingable along an arcuate slot in the disc which slot is radiused from the socketed pivot pin. The pressure disc has two such arcuate channels, each with a central recess-socket so that whichever pivot pin is lodged in a recess-socket changes with direction reversal of the trailer, thus facilitating backing. Selective lock holds forward pin in socket during usual forward towing of trailer to prevent accidental displacement of pins into reverse position.

PATENTED FEB 9 1971
3,561,790
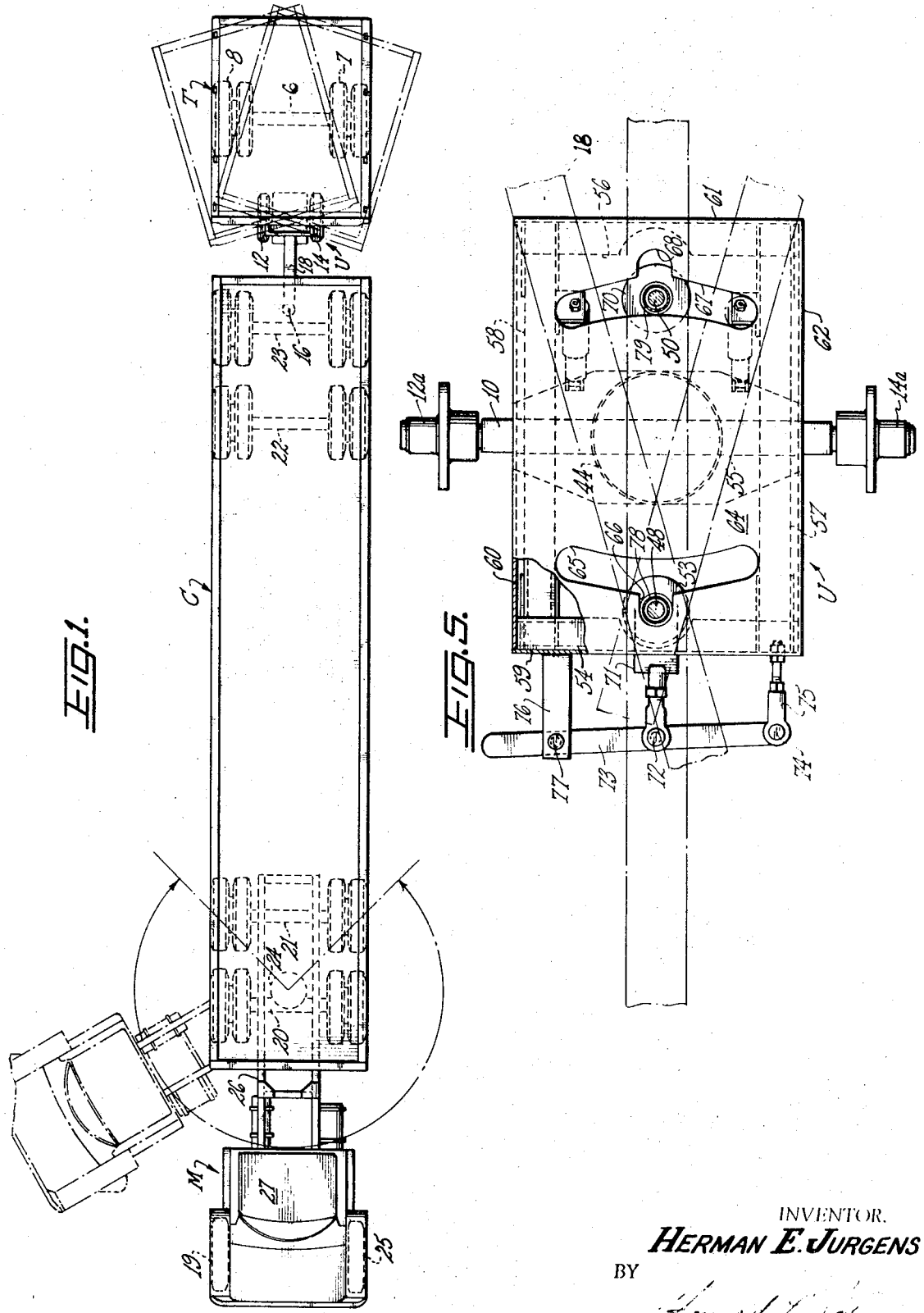
INVENTOR.
HERMAN E. JURGENS
BY
ATTORNEY

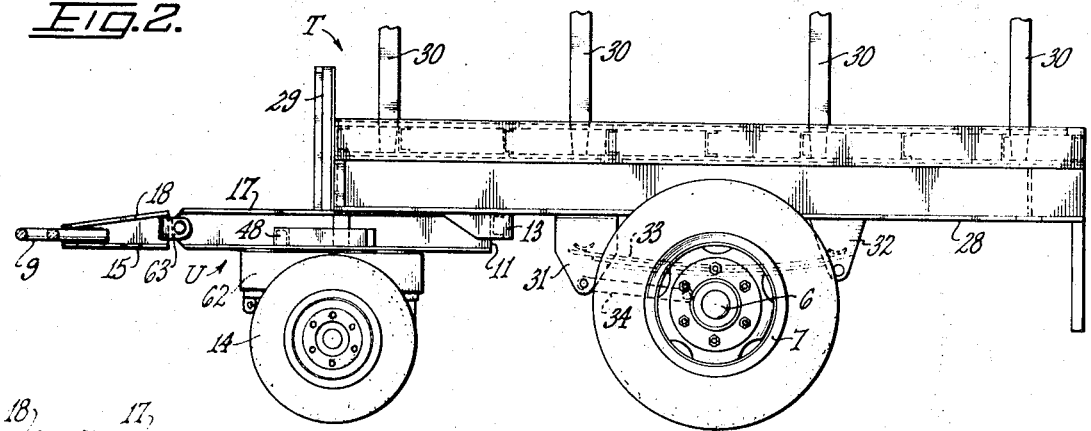
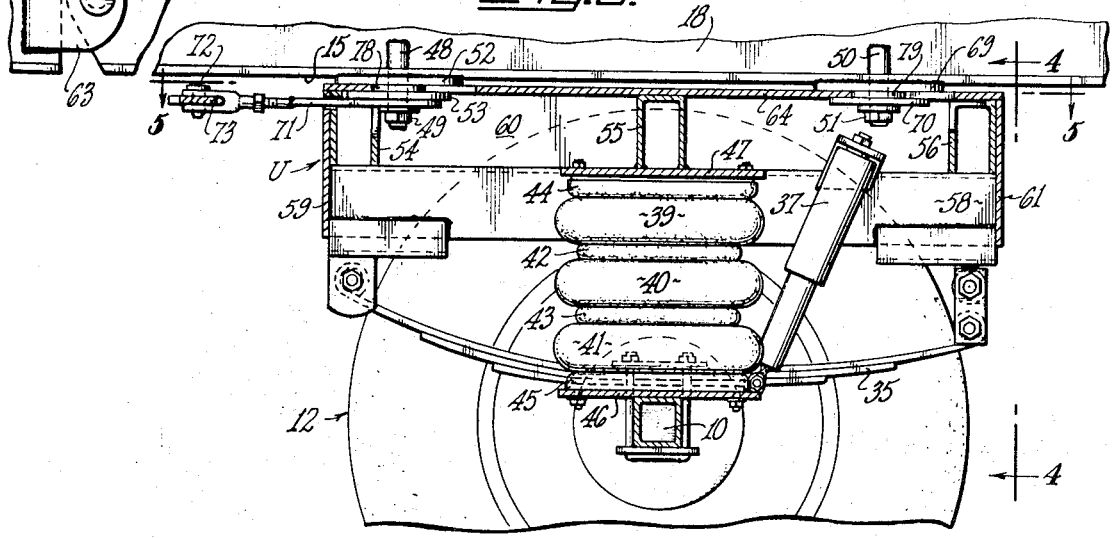
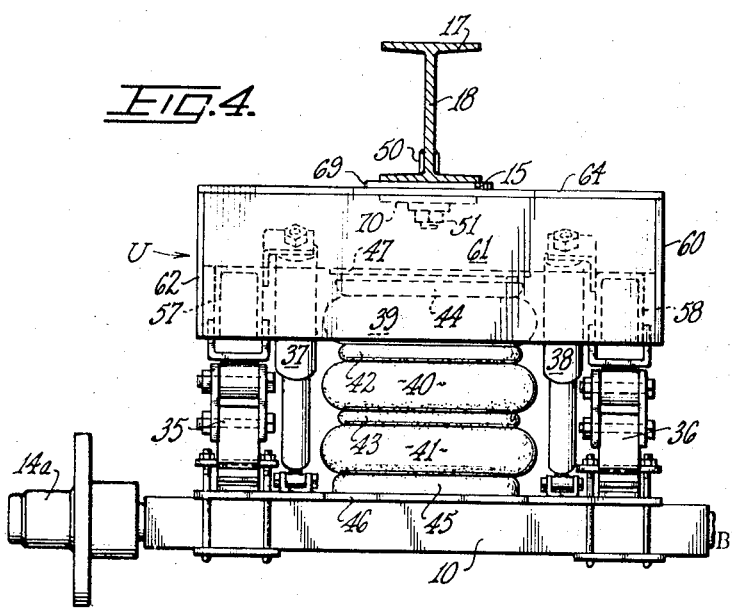
INVENTOR.
HERMAN E. JURGENS
ATTORNEY

SELF-STEERING AND BACKABLE TRAILER

BACKGROUND OF THE INVENTION

Trailers, including house trailers and boat trailers and especially those used to carry heavy cargo on the highways, have presented a problem in their tracking behind the lead vehicle, particularly in relation to making sharp turns and/or at high speeds and with heavy loads. In order to facilitate their turning or guidance, various mechanisms have been devised for guided swiveling of an axle as a unit from a pivot point central to its length. Other means have been suggested for turning each of a pair of wheels simultaneously an equal amount at their respective ends of a nonswiveling axle. Both types of mechanism have disadvantages. The drawn vehicle may increase or exaggerate the curvature path set by the towing vehicle and be thrown off the road or into another lane. Such weaving may endanger adjacent highway vehicles as well as nearby persons and objects along the highway. In extreme cases, the whipsaw or jackknife effect may wreck the towing vehicle as well. In addition, backing such towed vehicles is a problem; for example, the guide wheels may swerve in the opposite direction and stick in such position so as to be unable to roll at all.

Accordingly it is an object of the invention to provide a self-guiding dolly or undercarriage for pushed or pulled rollable structures or trailers, which dolly automatically shifts its self-guiding support position between alternate pivot-point locations beneath the trailer body, dependent upon whether the trailer is moved in one direction or the other. The trailer can thus be drawn forward or backed with equal facility by a drawbar or similar connection fixedly attached to the trailer body (rather than to the dolly). In effect, the dolly acts as a caster for which the amount of swiveling is limited to an arc of about 55° on each side of the longitudinal axis of the trailer; plus shifting between fore and aft pivot points which lie along the longitudinal axis on opposite sides of the transverse wheel axis of the dolly. A pressure plate or guide disc is provided between the trailer frame and undercarriage, typically carried by the dolly, and is formed with two transverse arcuate channels of similar curvature, each radiused from a central recess-socket of the convex edge of the other channel, the two recess-sockets being along the longitudinal axis of the trailer. Whichever unit (trailer frame or dolly) is vertically opposite the pressure plate, carries a pair of upright pivot pins, spaced apart by such distance so that whichever one is transiently located in one of said recess-sockets, the other pivot pin will be movable, by swinging of the dolly, across the length of the other arcuate channel. As noted in the foregoing abstract, in each case (moving forward or back) the functioning pivot pin is the one which lodges in the recess-socket nearest to the direction of trailer movement, that is, for forward towing, the forward pivot pin lodges in its recess-socket in front of the wheel axis of the dolly and the rear pivot pin is swingable across the rear channel; for backing, the opposite or rear pivot pin lodges in the recess-socket which is back of the wheel axis of the dolly and the remaining front pin then becomes swingable in the forward arcuate channel. These shifts are in response to initial start-up movement of the trailer frame, (and its dependent pivot pins) as the frame moves slidingly over the pressure plate of the supporting dolly.

In the drawings which illustrate by way of example, a presently preferred embodiment of the invention:

FIG. 1 is a top plan view of a tractor-trailer and backable trailer constructed with the present undercarriage, with backing positions of the tractor and remote trailer indicated in phantom.

FIG. 2 is a side elevational view of the uncoupled trailer.

FIG. 3 is an enlarged fragmental longitudinal vertical section through the undercarriage and forward portion of the structure of FIG. 2, particularly showing the suspension elements and swivel (pivot) mountings.

FIG. 4 is a transverse vertical section and elevation taken along the line 4—4 of FIG. 3.

FIG. 5 is a horizontal sectional view taken along the line 5—5 of FIG. 3 and showing the undercarriage in top plan with a portion broken away.

As particularly illustrated in FIG. 1, a trailer T provided with the present, forward, steerable dolly axle 10 and its attached wheels 12, 14, may be connected by means of a tow bar 18 to a rear swivel pin 16 beneath a towed cargo carrier C. The cargo carrier or semitrailer C is here exemplified by the large flat bed type which is provided with two rear axles 22, 23, each with dual tires. By the well-known king pin and pressure plate coupling 24, its forward end is attached to the rear support frame 26 of a tractor or towing vehicle M which is provided with a corresponding pair of axles 20, 21, with dual tires. All steering of the composite rig is done by the forward wheels 19, 25, of the tractor M, which in effect swivels about the king pin 24 relative to the semitrailer C. The operator in the cab 27 thus has no direct steering control of the rear trailer T other then trying to set the course it must take in following the semitrailer C. Hence such course becomes of particular concern in making turns either in following curves of a road, or in lane changing and weaving through traffic, as well as in backing the rig for parking or unloading when it is most important that the distant trailer arrive at a particular location with its rear and/or side squarely aligned with a fixed structure such as a loading dock.

As seen in FIGS. 2—4, the trailer T may be constructed with a generally horizontal and rectangular foundation or body 28 with forward cross wall 29 and upward opening sockets along its side edges for removable insertion of cargo retaining posts 30, and dependently carrying a nonswiveling wheel suspension assembly located a little to the rear of its center of gravity. The wheel assembly includes a pair of suspension brackets 31, 32, disposing a leaf-spring assembly 33 and radius rod 34 (such as shown in my U.S. Pat. No. 3,246,911) which locate a cross axle 6 and tire-carrying dual wheels 7, 8.

At the forward end of the trailer is an undercarriage or dolly U which disposes two wheels 12, 14, on opposite ends of a short axle 10. Inward from its ends the axle is carried by a pair of leaf-spring assemblies 35, 36, and intermediate thereto is supported by shock absorber units 37, 38. Centrally the axle 10 is supported by a generally cylindrical, tubular air-spring assembly formed by stacked convolutions 39, 40, 41, of neoprene interspersed by vertically separated girdlehoops 42, 43, and anchored respectively between upper 44 and lower 45 annular mountings to the lower axle plate 46 and upper transverse hanger plate 47 (FIGS. 3 & 5).

The drawbar 18 is formed by an I-beam of which the top longitudinal face 17 (FIG. 4) is fixedly secured to the underface of the trailer body 28, with its rear end 11 anchored against an abutment block 13. Forwardly, a coupling ring or eyelet 9 is disposed to receive the attachment pin 16 of the semitrailer C. A vertically swinging hinge 63 adjacent the forward end of the tow bar 18 eliminates the possibility of the tow bar exerting an upward pressure against the semitrailer C, due to highway unevenness. The drawbar thus swivels relative to the semitrailer but is laterally fixed relative to its own trailer body 28.

The underface 15 of the I-beam fixedly carries two downward projecting cylindrical pins 48, 50 of which the dependent end of each is threaded to receive a lock unit 49, 51. The pair of pivot pins serve to couple the rigid drawbar 18 (and trailer T) to the undercarriage U with its pair of dolly wheels 12, 14 as follows: the undercarriage U is constructed as a generally rectangular-frame or open-bottom box structure formed of cross-channel, inverted-U members 54, 55, 56, longitudinal inverted channel members 57, 58, outwardly embracing upright sidewalls 59, 60, 61, 62, and a top horizontal pressure plate or disc 64, which latter frictionally supports the underface 15 of the drawbar 18. The plate 64 (FIG. 5) is formed with a pair of complementary, arcuately disposed, vertical channels 65, 67 directed generally transversely and centered relative to the longitudinal axis of the trailer T and to the drawbar 18, each channel having a medial recess 66, 68 along the more distant or outer convex edges. The pair of downward projecting pivot pins 48, 50 are spaced apart along the longitudinal axis of the drawbar 18 by such distance that when one pin 48 or 50 is received in a recess 66 or 68, the other pin can swing across the length of the opposing slot 65 or 67. Thus, as the drawbar 18 is pulled forward by the semitrailer C, the forward pin 48 remains in the recess 66 and this forms the pivot point (in front of the axle 10) for the undercarriage or dolly U as the latter automatically aligns itself with the (straight or arcuate) path which is being followed by the rear wheels of the semitrailer C. Alternately, when the drawbar 18 of the trailer T is being pushed back or rearward, the pin 50 seats in the recess 68 and the other pin 48 is free to swing across the length of the channel 65 in accordance with the curve (or straight line) which is being followed by the semitrailer C (and rear wheels 7, 8 of the trailer). In either case, it will be observed that the pivot point (48 or 50) for the dolly U is in front of the axle 10 in relation to the direction in which the trailer T is moving. When this direction reverses, the pivot point shifts (by the dolly momentarily standing still and the trailer body 28 sliding lengthwise along the pressure plate 64). Each pin 48, 50 may carry a friction reducing annulus or washer 52, 53, 69, 70 adjacent opposite faces of the pressure plate 64 and vertically spaced apart to slidingly overlie opposing edges of the slide channel 65, 67; washers are separated by a ball bearing ring 78, 79 surrounding each pin 48, 50.

In order to lock the front pin 48 against accidental disengagement from its recess-socket 66 during forward running of the trailer T, there is a flat slide collar 71 which embraces the pin 48 and forwardly is pivoted at 72 to a crosswise lever arm 73. The latter is hinged at 74 to a forward projecting tie rod 75 with its opposite end detachably held to a support arm 76 by a removable lock pin 77. If desired, such selective lock means can be operated by remote control (as by air line) from the cab 27.

It will be seen that the dolly or undercarriage U thus acts as a caster, and as such a unit it can be mounted on various push-pull structures in addition to highway trailers, including those which are manually shifted about a work or storage area by an attendant. The cross length of the arcuate channel (65, 67) determines the extent of swiveling possible for the dolly, or in other words, this sets the maximum path of curvature which the trailer can track in being pushed or pulled. However, the actual pressure or lateral guidance applied directly to the dolly or caster is solely that which is automatically supplied by the pair of pivot pins 48, 50 in response to the caster wheels 12, 14 aligning themselves with the intended path as being transmitted to the trailer by action of the drawbar 18 (or by an individual pushing the trailer forward or backward while exerting tangential force). Thus a caster formed with such an arcuate channel pressure plate 64 and having a pair of upward extending pivot pins (48, 50) need only have the upper ends of the pins fixedly anchored in the underface of a wheeled or roller-supported structure in order to transform the latter to a self-guiding structure. Such a dolly unit may be an article of commerce by itself and such structures need not be limited to use of a single attached dolly.

It will be clear to those skilled in the art that various changes of construction and operation may be made within the present inventive concept, having in mind the substitution of functional equivalents within the ability of one skilled in the art, and therefor this disclosure is not to be limited by the precise details shown in the drawings and particularly described in the specification by way of example, but it is my invention to hereafter claim the invention broadly in its distinction from the prior art.

I claim:

1. A two-component trailer of the character described, including:

a first component comprising a body frame supported upon first roller means;

another component comprising an undercarriage bearing a transverse axle carrying second roller means, said undercarriage being spaced from said first roller means and also supporting said body frame;

a pair of upstanding pivot pins each having one end fixedly secured to one of the two components and their other ends each receivable alternately in one or the other of a pair of sockets of the other of said components, said pivot pins being spaced apart parallel to the longitudinal axis of said trailer approximately equidistant on opposite sides of said transverse axle of the undercarriage, and each pivot pin when unsocketed being movable laterally in an arc which is radiused from the socketed pivot pin; and means responsive to the direction of travel of the trailer for locating the socketed pivot pin in whichever socket is forward to said direction, including pressure plate means carried by one of said components in frictional registration with the other of said components, said pressure plate means being formed with sockets alternately disposed to receive one or the other of said pivot pins upon movement of the pair of pivot pins longitudinal to said trailer, whereby upon the trailer being moved in either direction, said undercarriage is steeringly self-adjusting by seating of one of said pivot pins in the forward socket.

2. The trailer of the preceding claim 1 wherein said pressure plate means is formed with a pair of arcuate channels, each radiused from an edge-located socket open to the other arcuate channel and thus disposed jointly, according to which way the trailer is being drawn, to transiently receive a first pivot pin in a socket of one channel and a second pivot pin movable along the length of the other arcuate channel, and upon reversal of direction of the trailer to receive said second pivot pin in the other socket and said first pivot pin movable along its arcuate channel.

3. The trailer of the preceding claim 1 which includes selective lock means for retaining one of said pivot pins in its respective socket.

4. The trailer of the preceding claim 1 which includes a vertically pivoted drawbar projecting from the end of said body frame which is supported by said undercarriage.

5. A wheeled structure movable in either direction and comprising a frame supported in part on nonswiveling wheels and in part on a swivel-mounted undercarriage, which undercarriage has alternate pivot means supporting said structure from beneath, said alternate pivot means being shiftable on change of direction toward whichever is the lead direction taken by the wheeled structure, between a pair of alternate, pivot sockets spaced apart lengthwise to the structure, which structure also has associated lateral limit means which restrict lateral pivoting of said undercarriage to a maximum of about 55° on either side of a line through said pivot points.

6. A caster-type unit of limited swivel, characterized by:

a generally horizontal pressure plate formed with a tandem pair of generally vertical, top-opening sockets spaced apart along the direction of travel of said unit;

a roller-carrying axle dependently carried by said pressure plate and located beneath and intermediate said pair of sockets; and a pair of upstanding pivot pins adapted to have their upper ends fixedly attached to a movable structure which is supported on said pressure plate, and their lower ends received alternately in one or the other of said sockets with the nonsocketed pin movable laterally thereto, whereby said caster may swivel laterally to the extent of possible movement of the nonsocketed pin with turning of the other pin in the socket which is forward to the direction of travel of said axle and unit.

7. The unit of the preceding claim 6 wherein said pressure plate is formed with a complementary pair of transverse, arcuate channels, each radiused from one of said sockets and extending from the convex edge of the other channel, each pivot pin being movable into and out of socket from the adjacent arcuate channel, whereby alternately each one of said pivot pins may lodge in its respective socket while the other member is movable along the other arcuate channel, the particular pivot pin which is thus socketed being self-locating in response to directional movement of the structure which is supported on the pressure plate.